United States Patent
Beck

(10) Patent No.: US 8,179,000 B2
(45) Date of Patent: May 15, 2012

(54) PHOTOVOLTAIC SYSTEM WITH BATTERY AND RESERVE POWER PLANT

(75) Inventor: Bernhard Beck, OT Dimbach (DE)

(73) Assignee: Adensis GmbH, Dresden (DE)

( * ) Notice: Subject to any disclaimer, the term of this patent is extended or adjusted under 35 U.S.C. 154(b) by 213 days.

(21) Appl. No.: 12/763,634

(22) Filed: Apr. 20, 2010

(65) Prior Publication Data

US 2010/0264732 A1   Oct. 21, 2010

(30) Foreign Application Priority Data

Apr. 21, 2009   (DE) .......................... 10 2009 018 240

(51) Int. Cl.
*G05F 3/06* (2006.01)
*H02M 1/20* (2006.01)
*H02P 1/04* (2006.01)

(52) U.S. Cl. ........................ 307/151; 363/102; 318/480
(58) Field of Classification Search .................... 307/29, 307/151
See application file for complete search history.

(56) References Cited

U.S. PATENT DOCUMENTS

| | | | |
|---|---|---|---|
| 1,413,158 A | 4/1922 | Caple | |
| 7,609,019 B2 | 10/2009 | Beck et al. | |
| 2007/0290636 A1* | 12/2007 | Beck et al. | 318/106 |
| 2009/0101191 A1 | 4/2009 | Beck et al. | |
| 2009/0134297 A1 | 5/2009 | Beck | |
| 2010/0090634 A1* | 4/2010 | Beck et al. | 318/480 |

FOREIGN PATENT DOCUMENTS

| | | |
|---|---|---|
| DE | 29 39 977 | 4/1980 |
| DE | 10251833 B3 | 4/2004 |
| DE | 102005000998 | 7/2006 |
| GB | 267607 | 3/1927 |

OTHER PUBLICATIONS

Hess: "Das Institut für Elektrotechnik 2 der Technischen Hochschule zu Aachen", excerpt from *Elektrotechnische Zeitschrift*, Nov. 11, 1937, vol. 45.

* cited by examiner

*Primary Examiner* — Rexford N Barnie
*Assistant Examiner* — Toan Vu
(74) *Attorney, Agent, or Firm* — Henry M. Feiereisen

(57) ABSTRACT

A method for operating a photovoltaic system with a plurality of photovoltaic modules and with a DC motor connected to the photovoltaic modules is proposed. The motor shaft of the DC motor is coupled to a generator shaft of a three-phase generator, wherein the three-phase generator can be connected to a power grid. The motor shaft of a second DC motor can also be connected with the generator shaft, and the electric energy produced by the photovoltaic modules is initially only used for driving a single DC motor and is during the subsequent operation divided between those DC motors. A battery is provided which can be connected with the second DC motor instead of the PV system by changing the excitation of the second DC motor such that it's motor voltage corresponds to the open-circuit voltage of the battery.

17 Claims, 2 Drawing Sheets

PHOTOVOLTAIC SYSTEM WITH BATTERY AND RESERVE POWER PLANT

CROSS-REFERENCES TO RELATED APPLICATIONS

This application claims the priority of German Patent Application, Serial No. 10 2009 018 240.3, filed Apr. 21, 2009, pursuant to 35 U.S.C. 119(a)-(d), the content of which is incorporated herein by reference in its entirety as if fully set forth herein.

BACKGROUND OF THE INVENTION

The invention relates to a method and a device for operating a photovoltaic (PV) system having a plurality of photovoltaic modules and a first and a second DC motor connected to the photovoltaic modules, wherein the DC motors are or can be coupled to a three-phase generator, wherein the three-phase generator can be connected to a power grid, and wherein the electric energy supplied by a photovoltaic modules can be distributed to the to DC motors in any selected arrangement.

The following discussion of related art is provided to assist the reader in understanding the advantages of the invention, and is not to be construed as an admission that this related art is prior art to this invention.

A device of this type has been described in prior U.S. application Ser. No. 12/649,536, filed Dec. 30, 2009, entitled "METHOD FOR OPERATING A PHOTOVOLTAIC SYSTEM AND PHOTOVOLTAIC SYSTEM FOR CARRYING OUT THE METHOD" by the same applicant, which is incorporated herein by reference. Supply contracts with associated energy providers frequently require that the solar power plants are designed to supply to the power grid an agreed-upon minimum power within a determined time interval. For example, a 2.4 MW solar power plant may be required to supply between 11 AM and 5 PM at least 60% of the rated power, meaning about 1.5 MW. Depending on the weather, this minimum power cannot always be generated by the solar system alone.

It would therefore be desirable and advantageous to provide an improved method and a device for operating a solar power plant which obviate prior art shortcomings and are capable of supplying the required minimum power level at any time.

SUMMARY OF THE INVENTION

The present invention resolves the prior art problems by connecting a first group of the photovoltaic modules to the first DC motor and a second group also take modules to the second DC motor, by configuring one of the DC motors for connection to a battery and four using a control unit which connects at one step the energy supplied by the photovoltaic modules to one of the DC motors, and connects in an additional step the excitation also one DC motor such that its motor voltage is below the battery open circuit voltage for a desired battery discharge, so that the battery is discharged into the one DC motor.

The two aforementioned steps can also be interchanged.

With this measure, the power deficiency can be supplied from the battery when the power supplied by the solar system is less than the minimum power level.

Because of the battery is able to compensate for the energy deficiency only for a limited time of several minutes, it would be advantageous to set up a reserve power plant for supplying power to the grid, as soon as it becomes evident that the photovoltaic system generates power less than the minimal power not just temporarily, for example when a cloud passes by. Accordingly, connecting the battery should be linked to the startup of a reserve power plant or the addition of an already operating reserve power plant. The reserve power plant is capable of supplying DC current and may be a conventional diesel generator with a rectifier able to produce the auxiliary power within about one minute. Advantageously, the elapsed time from the request by the control until the reserve power plant is actually connected to the DC motor is between one and five minutes, more particularly between two and four minutes.

One criterion prompting a request of auxiliary power from the power plant may be, for example, that the electric power generated via the photovoltaic modules is less than a minimum value during a predetermined time interval. Another possible criterion may be that the product of the power generated by the photovoltaic modules and a time interval (meaning the integrated power) is less than a predetermined minimum value. However, other criteria may be contemplated which take into account the characteristics observed power drop of the photovoltaic system, for example hard changes from shadow to light, cirrocumulus clouds, high fog, etc.

Advantageous, when the battery is actually connected to the DC motor, the control unit initially regulates the motor voltage as precisely as possible to match the battery open-circuit voltage and thereafter reduces the motor voltage in order to set a desired discharge current. With this measure, the battery can advantageously be connected to the DC motor almost without a current flow, thereby reducing wear of the associated switch.

The motor voltage can be reduced incrementally or continuously. While the motor voltage is reduced, a desired ratio of power supplied by the PV-module to the power supplied by the battery may advantageously also be set.

The battery itself is composed of a plurality of conventional car batteries having a respective short-time current capacity of at least 500 A, which are partially connected in series to provide a battery voltage of 96 V, and which are partially connected in parallel to increase the total output current. The battery voltage of 96 V is viewed as a good compromise between the high currents to be transmitted and the number of the battery cells to be monitored. The battery can in principle have any voltage between 80 V and 150 V, whereby a current of 4000 A is already available at a voltage of 100 V to drive the DC motor at a supplied power of, for example, 400 kW. With an effective monitoring capability of the cells, the battery voltage can also be designed for a photovoltaic system providing a voltage of, for example, 400 V.

The battery may be charged either with an external charging device, with the photovoltaic system itself by increasing the motor voltage to a value greater than the nominal voltage of the battery, or with the reserve power plant. Several of the aforementioned possibilities can be provided concurrently. The charging method can then be selected based on the current drawn from the battery. For example, high PV power with short time fluctuations due to shadowing may be available at noontime, so that it would be advantageous to use a DC charging device, which can be connected to the battery poles at as often as desired and on short notice without a complicated connection process.

Advantageously, the battery should always be kept in a fully charged state. For this reason, each discharge process of the battery should be immediately followed by a charging process, optionally by using the reserve power plant. This is also important because a rechargeable lead battery should always be fully charged and never fully discharged, because a complete discharge may damage the cells.

To prevent damage to the DC machines, the value of the temperature of the DC motor driven by the photovoltaic system is advantageously transmitted to the control unit. If a predetermined temperature limit is exceeded, the connections of the battery are switched from the DC motor that previously received power from the photovoltaic system to the other DC motor, whereas the other DC motor that previously received power from the battery is now powered by the photovoltaic system. In a particularly advantageous embodiment, both DC motors are provided with a device for temperature monitoring, because not only the DC motor to which the entire load of the photovoltaic system is supplied may overheat, but also the other DC motor which receives the high battery current at low voltage. The control unit must then provide compensation by optionally switching several times between the energy sources that drive the DC motors.

When both DC motors approach a predetermined upper temperature, the reserve power plant must be switched in. The reserve power plant can be operated at an output voltage of 400 V, but also at the voltage of the PV system of about 700 V, in which case the currents are again close to the nominal current of the DC machines. Ideally, the output voltage of the reserve power plant is regulated to match the voltage of the photovoltaic system. In this way, the battery can then be replaced, after short-time use, by the reserve power plant as supplier of power for a longer time of, for example, 5 to 20 minutes, and the excitation of the DC motor can again be regulated to the output voltage of the PV system. The DC motor previously powered by the battery can now be simultaneously supplied from both the reserve power plant as well as from the photovoltaic system. Certain equalizing currents must be tolerated, or the output voltage of the reserve power plants is continuously adjusted to match the voltage of the PV system. This approach ensures a high minimum power, for example, of 80% of the nominal power of the photovoltaic system.

With respect to the device, the photovoltaic system of the invention is characterized by a plurality of photovoltaic modules, to DC motors which can be connected to the photovoltaic modules and which are, if connected, supplied with a DC voltage and a DC current, by a three-phase generator which can be connected with the first and/or the second DC motor by way of a coupling, and by a battery that can be connected to at least one of the DC motors, wherein the switch-in areas controlled by a control unit, wherein a switch-in criterion is a predetermined minimum output power of the three-phase generator.

Essentially, the same advantages obtained with the afore-described embodiments of the method also be apply to the device.

The total generated power can be connected to a single DC motor by dividing the photovoltaic modules into a first and a second group, wherein the first group supplies its generated power to a first output, and the second group supplies its generated power to a second output, wherein the first and second output can each be connected to the input of the first and the second DC motor, respectively, by a switching device, wherein a bridge switch connects, when closed, the first output with the second output. Primarily, a parallel connection of the two outputs is comtemplated.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
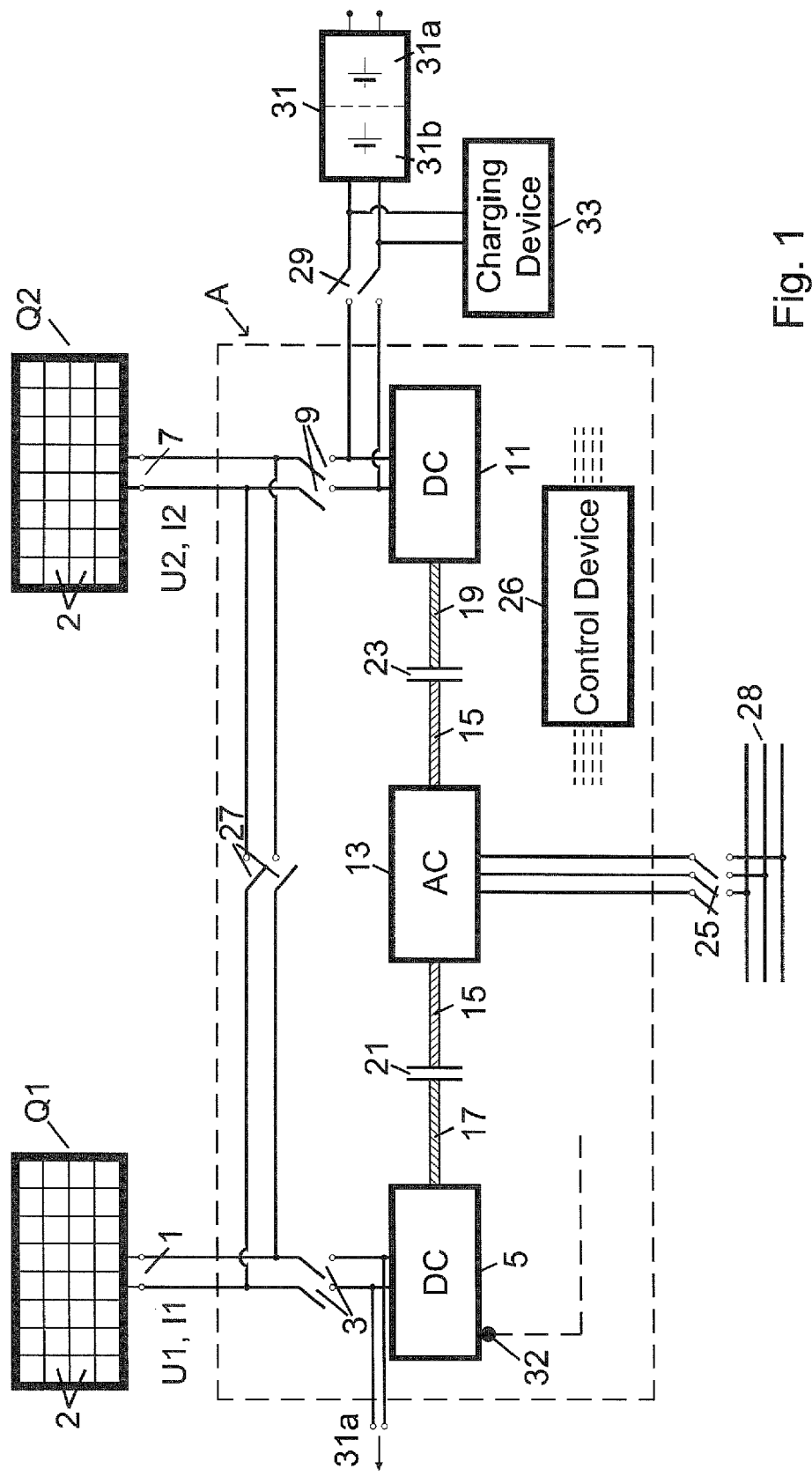
FIG. 1 is a schematic block diagram of an electromechanical converter with two DC motors, a three-phase generator, and a battery.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a photovoltaic system with a first group Q1 of photovoltaic modules 2 as a first energy source, which has an first output terminal pair 1 supplying a DC voltage U and a DC current I. The output terminal pair 1 is connected to a first externally-excited DC motor 5 by way of a first switch 3 for powering the DC motor 5.

Likewise, a second group Q2 of photovoltaic modules 2 representing a second energy source, which has a second output terminal pair 7 supplying a DC voltage U2 and a DC current I2 are shown on the right side of FIG. 1. The second output terminal pair 7 is connected to a second DC motor 11 by way of a second switch 9 for powering the DC motor 11.

A three-phase generator 13 is arranged between the two DC motors 5, 11, with the generator shaft 15 of the three-phase generator 13 being aligned with the two motor shafts 17, 19 of the DC motors 5, 11. The generator shaft 15 protrudes from the left side and the right side of the DC generator 13 and is provided on each of the respective free ends with a respective coupling 21 and 23. The shafts 17, 19 of the DC motors 5, 11 can be separately connected to the three-phase generator 13. Alternatively, a fixed connection, without couplings 21, 23, may also be implemented. The three-phase generator 13 includes an electric terminal 25 for connection to a power grid 28.

Also provided is a control unit 26 configured to disconnect or connect the switches 3 and 9, as indicated by dashed lines. The control unit 26 is also configured (likewise indicated by dashed lines) to connect or disconnect the couplings 21, 23. The control unit 26 is also equipped with a signal generator which actuates a bridge switch 27 for connecting the output terminals 1 and 7 with each other. When the bridge switch 27 is closed, the two outputs 1 and 7 are connected in parallel. During startup of the first DC motor 5, the bridge switch 27 is closed, and the power E2 from the second energy source Q2 is supplied in addition to the power E1 from the first energy source Q1 to the input of the first DC motor 5. When the power of the first DC motor 5 reaches a predetermined value, in particular its nominal power, the bridge switch 27 is opened. The electric energy generated by the energy source Q2 is then used for a startup and subsequent operation of the second DC motor 11. When the rotation speed of the motor shaft 19 is matched to that of the generator shaft 15, the control unit transmits a signal for initiating engagement of the coupling 23. After the coupling process is complete, the motor shafts 17, 19 in conjunction with the generator shaft 15 form a connected rotating assembly.

A battery 31 can be connected to the second DC motor 11 via a battery switch 29. The battery 31 is in turn connected by way of an additional unillustrated switch with a charging device 33, in particular a charging device with a rectifier which is powered, for example, from the power grid 28.

If the terminal 25 is unable to supply the defined minimum power to the power grid, then the control unit 26 is configured to initially open the switch 9, to regulate the voltage of the second DC motor 11 to match the battery open-circuit voltage through a change in the excitation of the second DC motor 11, and to subsequently close the battery switch 29 for supplying additional energy into the system A in addition to the solar energy. The additional energy is supplied by decreasing the motor voltage on the second DC motor 11 after the battery switch 29 is closed, which causes power to flow from the battery 31 to the DC motor 11.

During normal operation, the full output power of the system is reached. The bridge switch 27 as well as the battery switch 29 are then opened, so that the battery 31 no longer supplies power; the first energy source Q1 then supplies the first motor 5, while the second energy source Q2 supplies the second motor 11

The DC motors 5 and 11 are controlled, for example, according to the MPP method which is described in an advantageous embodiment in U.S. Pat. No. 7,609,019, which is incorporated herein by reference.

When the power E1+E2 from the two energy sources Q1 and Q2 combined is less than the minimum power contracted in the supply agreement, the bridge switch 27 is closed, while the switch 9 is opened, and the battery switch 29 is also closed. The battery 31 is connected to the second motor. The battery hence supplies than the difference between the energy supplied from the energy sources Q1, Q2 and the guaranteed minimum power.

It is hereby assumed that the first motor 5 is powered by the photovoltaic system A (i.e., from the energy sources Q1 and Q2 combined) and that the second motor is powered from the battery 31. However, this risk that the first motor 5 overheats.

Preferably, both the first DC motor 5 and the second DC motor 11 may be connected to the battery. It is hereby immaterial if a change-over switch is provided or if—as indicated by dashed lines—the battery 31 is divided into two separate batteries 31a 31b, with one with the first DC motor 5 and the other battery 31b associated with the second DC motor 11. This measure is important in the context of the following description regarding heating of the DC current machines 5, 11.

To prevent damage to the DC current machines 5, 11, a device for monitoring the temperature is provided. The measurement temperature value of the first DC motor 5, which is powered by the photovoltaic system, is advantageously transmitted from a sensor 32 (via the indicated dashed lines) to the control unit 26. It will be assumed that the first motor 5 is powered by Q1 and Q2 while the second motor 11 is powered from the battery 31. The first motor 5 is in danger of becoming overheated. A safety measure is now instituted in that if a predetermined temperature limit is exceeded, the battery 31 is switched over from the first DC motor 5 previously supplied by Q1 and Q2 to the other DC motor 11, whereas the other DC motor 11 previously powered by the battery 31 is now powered from Q1+Q2. Accordingly, the drive conditions have been interchanged.

Advantageously, both DC motors 5, 11 may be provided with a temperature monitoring device, because both the DC motor which receives the entire load of the photovoltaic system, as well as the other DC motor which is supplied with the high battery current at low voltage may overheat. The control unit 26 should here provide equalization by optionally switching several times between the energy sources, solar energy on one hand, and battery/backup source on the other hand.

The individual DC motors 5, 11 may still be overloaded even if they only supply a portion of the total nominal power. This situation occurs when the minimum power of, for example, about 70% of the nominal power (from first and second energy source Q1, Q2 combined) is not attained, but the PV system (the combination of Q1 and Q2) still supplies 60% of its nominal power. In this situation, the energy supplied by the second energy source Q2 is diverted to the first DC machine 5 by closing the bridge switch 27, with the first DC machine 5 now receiving 60% of the total energy. This represents an overload of 20% relative to half of the total power for this DC motor 5.

This will now be illustrated in the following numerical example: a solar system A with a total of 2.4 MW is installed. This system is subdivided into parts of equal size, so that the power E1 supplied by Q1 is equal to the power E2 supplied by Q2, namely 1.2 MW each. The respective associated DC motors 5, 11 are each rated for a power of 1.2 MW. The actual incident solar radiation supplies a power of 1.4 MW, corresponding to a power level of 60% of the photovoltaic system (Q1+Q2). However, to meet the supply contract with the energy supplier, 70% of the nominal power, namely 1.68 MW, is to be supplied. Accordingly, there is a deficit of 0.24 MW, which must be supplied from a backup source. After the switch 9 is opened and the bridge switch 27 is closed, 1.68 MW is supplied to the first DC motor 5. However, this represents 0.24 MW (=20% of the nominal power) more than the continuous power rating of the first DC motor 5. The missing 0.24 MW is then supplied to the second DC motor 11 from the battery.

Accordingly, the temperature of both DC motors 5, 11 may be provided with a device for temperature monitoring to prevent overheating. Initially, one of the DC motors 5, 11 is operated with the higher current, until the motor has reached a machine-related temperature limit. At that point, the aforementioned switchover takes place. The affected warmer DC motor 5, 11 is then operated with the lower current when reaching the temperature limit, whereas the other, cooler DC motor 5, 11 is thereafter powered from the energy source (PV system or battery) that supplies the higher current to the motor 5, 11.

Instead of controlling the switchover via the current, a more accurate initiation of the change in both directions can also be performed by analyzing the energy dissipated in the DC motors 5, 11.

Figure 2:
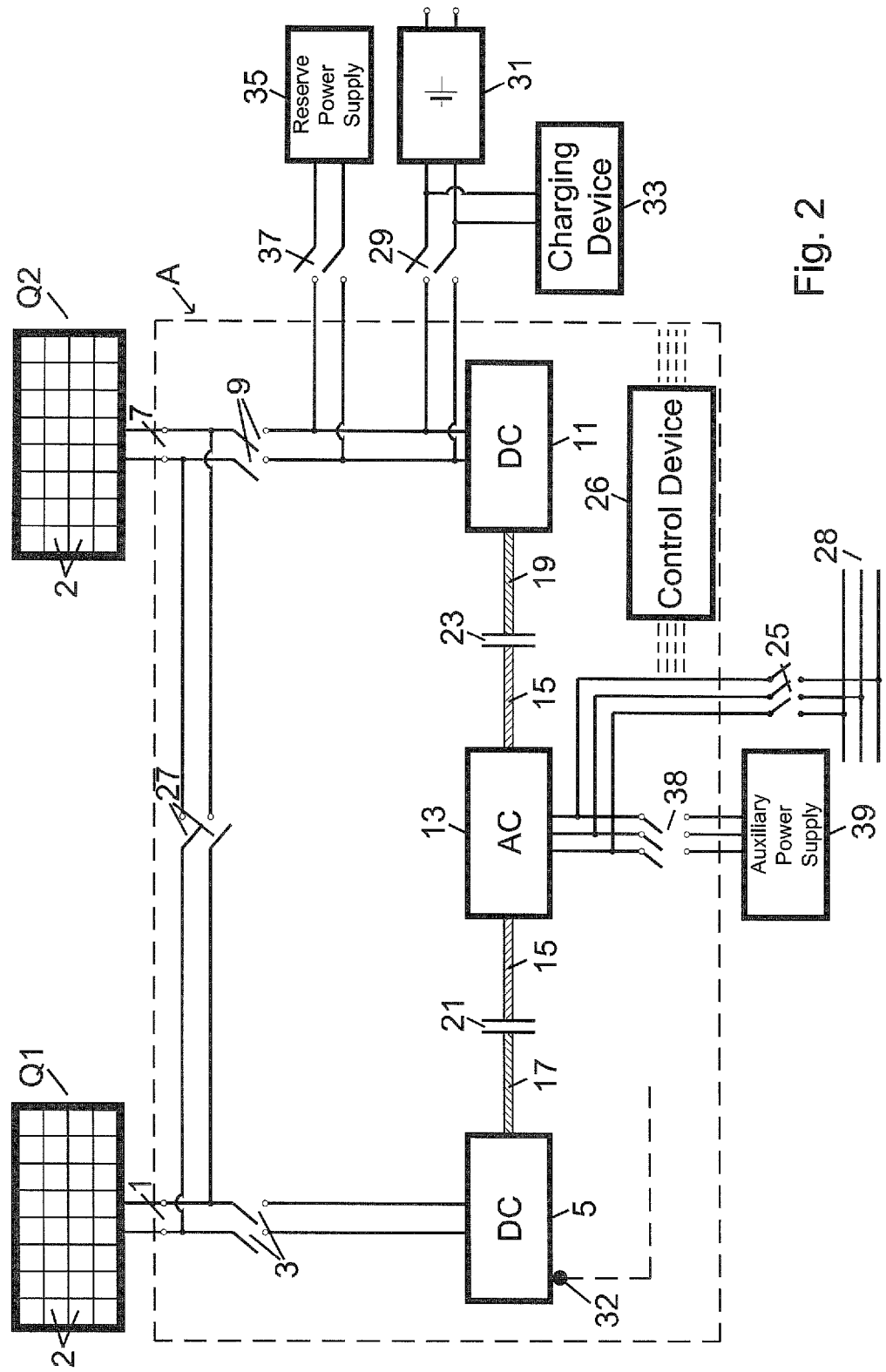
FIG. 2 is a schematic block diagram of an electromechanical converter with two DC motors, a three-phase generator, and a battery and a reserve power plant.

If the reduced amount of power supplied by the photovoltaic system (Q1+Q2) may last for an extended period of time of several minutes, then the embodiment illustrated in FIG. 2 should be implemented in order to guarantee that a minimum quantity of energy is supplied to the power grid.

In this FIG. 2, identical elements have the same reference symbols as in FIG. 1. FIG. 2 is similar to FIG. 1, except for the added DC reserve power plant 35 which can be connected to the second DC motor 11 by way of an additional switch 37.

The battery 31 can only be used to briefly compensate for an energy shortage in order to supply the contracted power from the PV system A. In the reduced power output continues, the reserve power plant 35 instead of the battery 31 may be connected to the second DC motor 11. Depending on the selected reserve power plant 35, different startup times are required to set up a connection of the reserve power plant 35. The setup time for a diesel generator with a rectifier until the final operating state is reached about one minute. The setup time for a fuel cell may be several minutes. Accordingly, the control unit is designed to start the reserve power plant 35 up early, to avoid the risk that the battery 31 is drained before the reserve power plant 35 is finally connected.

According to one criterion, a connection may be initiated if the electric power generated by the photovoltaic modules 2 is below a minimum value for a predetermined time interval. This means, for example, that the connection process is initiated as soon as the photovoltaic system remains below the minimum power level for about one minute and the battery needed to be connected during this one minute. According to another criterion, a connection may be initiated if the product of the electric energy produced by the photovoltaic modules and a time interval is less than a predetermined minimum value. In other words, the reserve power plant 35 may be connected when 20% of the battery capacity is used up over a time of 6 minutes, because energy from the battery was used to make up for the power deficiency in order to cover the contractually guaranteed power.

It is essentially unimportant if the criteria are designed to use the time when the reserve power plant is set up or the time of the actual connection as a basis for the calculation. In a second case, the required setup time of the reserve power plant must, of course, be included in the calculation.

The reserve power plant 35 is therefore used, on one hand, to rapidly charge the battery 31 and, on the other hand, to provide the minimum power for a relatively short time of, for example, 5 to 20 minutes.

If it can be anticipated that the auxiliary power from the battery 31 and the reserve power plant 35 may be required for a longer time of, for example, between 20 minutes and several hours, then an auxiliary power plant 39 is switched in on the AC side via switch 38. This auxiliary power plant 39 may be located remote at a different location in the supply grid. For example, the auxiliary power plant 39 may be a gas-fired power plant which can be ready to supply energy after a setup time of about four minutes. The control unit 26 can here also be used to start up and/or connect the auxiliary power plant 39.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a photovoltaic system having a plurality of photovoltaic modules, two DC motors separately connectable to the photovoltaic modules, and a three-phase generator connectable to a power grid, comprising the steps of:

in an operating state of the photovoltaic system, supplying electric energy from a first group of the photovoltaic modules to a first of the two DC motors and supplying electric energy from a second group of the photovoltaic modules to the second DC motor; thereafter in a first step, supplying electric energy from both the first group and the second group of the photovoltaic modules exclusively to the first DC motor;

in a second step, supplying electric energy from a battery to the second DC motor; and in a third step, exciting the second DC motor such that the motor voltage of the second DC motor is less than an open-circuit voltage of the battery for a desired battery discharge, so that the battery is discharged into the second DC motor.

2. The method of claim 1, further comprising the steps of initially regulating the motor voltage so as to substantially match the battery open-circuit voltage and subsequently reducing the motor voltage in order to produce a desired battery discharge current.

3. The method of claim 1, further comprising the steps of initially regulating the motor voltage so as to substantially match the battery open-circuit voltage and subsequently reducing the motor voltage until a desired ratio between power supplied by the photovoltaic module and power supplied by the battery is attained.

4. The method according to claim 1, further comprising the step of starting up a reserve power plant or connecting an already operating auxiliary power plant in conjunction with connecting the battery.

5. The method according to claim 1, wherein the battery comprises a plurality of conventional car batteries with a short-duration current carrying capacity of at least 500 A, which are partially connected in series to provide a battery voltage of 96 V and which are partially connected in parallel to increase a total output current.

6. The method of claim 4, wherein the reserve power plant is started up or the auxiliary power plant is connected when the electric power supplied from the photovoltaic modules is less than a minimum value for a predetermined time interval.

7. The method of claim 6, wherein the time interval is between 1 and 5 minutes.

8. The method of claim 6, wherein the time interval between 2 and 4 minutes.

9. The method of claim 4, wherein the reserve power plant is started up or the auxiliary power plant is connected when a product of the electric power supplied from the photovoltaic modules and a time interval is less than a predetermined minimum value.

10. The method according to claim 1, wherein the battery is charged from an external charging device, from the photovoltaic system by increasing the motor voltage to a value above a nominal voltage of the battery, or from the reserve power plant.

11. The method according to claim 10, wherein the battery is charged immediately being discharged.

12. The method according to claim 1, further comprising the steps of:

measuring a temperature of at least a first DC motor supplied with power from the photovoltaic system, and if a predetermined temperature limit is exceeded, disconnecting from the photovoltaic system the first DC motor, which was previously from the photovoltaic system, and connecting the first DC motor to the battery, and disconnecting from the battery the second DC motor, which was previously supplied from the battery, and connecting the second DC motor to the photovoltaic system.

13. A photovoltaic system comprising:

a plurality of photovoltaic modules, a first DC motor and a second DC motor configured for connection to the photovoltaic modules and receiving from the photovoltaic modules a DC voltage and a DC current;

a three-phase generator having an AC side configured for connection to a power grid for supplying an AC voltage;

a mechanical coupling configured to connect a shaft of at least one of the first and second DC motors to a shaft of the three-phase generator, a battery configured for connection to at least one of the DC motors, and a control unit controlling at least the connection between DC motors, the photovoltaic modules and the battery, wherein the connections are performed by:

connecting a first group of the photovoltaic modules to the first DC motor;

connecting a second group of the photovoltaic modules to the second DC motor, wherein a total power supplied from the photovoltaic modules is divided among the first and second DC motor in an arbitrary fashion;

connecting the battery to the second DC motor;

switching the total power supplied from the photovoltaic modules to the first DC motor; and exciting the second DC motor such that the motor voltage of the second DC motor is less than an open-circuit voltage of the battery for causing the battery to discharge into the second DC motor, wherein a connection criterion is attainment of a predetermined minimum output power of the three-phase generator.

14. The photovoltaic system of claim 13, wherein the photovoltaic modules are divided into a first and a second group, wherein the first group provides energy produced by the first group to a first output and the second group provides the energy produced by the second group to a second output, the system further comprising
a switching element which connects the first and the second output to a corresponding input of the first and the second DC motor, and
a bridge switch connecting in a closed state the first output with the second output.

15. The photovoltaic system of claim 13, further comprising a reserve power plant configured for connection to at least one of the DC motors.

16. The photovoltaic system of claim 13, further comprising an auxiliary power plant configured for connection to the AC side of the three-phase generator.

17. A method for operating a photovoltaic system having a plurality of photovoltaic modules, a first and a second DC motors connectable to the photovoltaic modules, and a three-phase generator connectable to a power grid, comprising the steps of:

connecting a first group of the photovoltaic modules to the first DC motor;

connecting a second group of the photovoltaic modules to the second DC motor, wherein a total power supplied from the photovoltaic modules is divided among the first and second DC motor in an arbitrary fashion;

connecting a battery to the second DC motor;

switching the total power supplied from the photovoltaic modules to the first DC motor; and exciting the second DC motor such that the motor voltage of the second DC motor is less than an open-circuit voltage of the battery for causing the battery to discharge into the second DC motor.

\* \* \* \* \*